US012693301B2

(12) United States Patent
Katano et al.

(10) Patent No.: US 12,693,301 B2
(45) Date of Patent: Jul. 28, 2026

(54) METHOD OF CONTROLLING MULTI-STREAM AUTOMATIC ANALYZER TIMING

(71) Applicant: HITACHI HIGH-TECH CORPORATION, Tokyo (JP)

(72) Inventors: Toshiaki Katano, Tokyo (JP); Takayuki Sugime, Tokyo (JP); Naoto Sakamoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 563 days.

(21) Appl. No.: 18/039,536

(22) PCT Filed: Dec. 2, 2021

(86) PCT No.: PCT/JP2021/044230
§ 371 (c)(1),
(2) Date: May 31, 2023

(87) PCT Pub. No.: WO2022/124187
PCT Pub. Date: Jun. 16, 2022

(65) Prior Publication Data
US 2023/0417781 A1     Dec. 28, 2023

(30) Foreign Application Priority Data

Dec. 11, 2020     (JP) ................................. 2020-205571

(51) Int. Cl.
*G01N 35/00*          (2006.01)
(52) U.S. Cl.
CPC ................................. *G01N 35/0092* (2013.01)
(58) Field of Classification Search
CPC .. G01N 30/38; G01N 30/466; G01N 30/8668;
G01N 2030/8804;
(Continued)

(56) References Cited

U.S. PATENT DOCUMENTS 8,943,909 B2 *   2/2015   Chida .................. G01N 35/026
73/863.01
10,401,334 B2 *   9/2019   Ohashi ................... G01N 30/34
(Continued)

FOREIGN PATENT DOCUMENTS

JP          2000-249694 A     9/2000
JP          2001-053875 A     6/2001
(Continued)

OTHER PUBLICATIONS

English translation to JP 2015052533 (Year: 2015).*
(Continued)

*Primary Examiner* — Tran M. Tran
(74) *Attorney, Agent, or Firm* — Miles & Stockbridge, P.C.

(57)                ABSTRACT

A method of controlling an automatic analyzer includes searching for a substitute stream that can be substituted, in a case where an abnormality of a stream is detected for a liquid chromatograph having multiple streams, after setting an analysis schedule; and modifying the analysis schedule, if a substitute stream exists, so that a sample scheduled to be introduced into the stream which has the abnormality is introduced into the substitute stream, and treatment timings of the sample which has passed through the substitute stream and the sample which has passed through another normal stream in the detector do not overlap with each other, in which the automatic analyzer includes a pretreatment unit that purifies a sample; a separation unit; and a detector that detects a separated sample, and a treatment timing of the sample in the separation unit and the detector is controlled based on the analysis schedule.

6 Claims, 5 Drawing Sheets

(58) Field of Classification Search
CPC ....... G01N 2030/8872; G01N 35/0092; G01N
35/00594; G01N 35/00613; G01N
35/00663; G01N 35/1095; G01N
2035/00643
See application file for complete search history.

(56) References Cited

U.S. PATENT DOCUMENTS

| | | | | | |
|---|---|---|---|---|---|
| 10,429,360 | B2 * | 10/2019 | Ohashi | .................... | G01N 30/32 |
| 10,866,217 | B2 * | 12/2020 | Yasunaga | ............... | G01N 30/20 |
| 10,890,566 | B2 * | 1/2021 | Katsuyama | ........ | G01N 30/8658 |
| 11,215,627 | B2 * | 1/2022 | Imai | ................... | G01N 35/1002 |
| 11,448,625 | B2 * | 9/2022 | Terada | ................... | G01N 30/34 |
| 11,543,395 | B2 * | 1/2023 | Nakashima | ............ | G01N 30/88 |
| 11,565,266 | B2 * | 1/2023 | Watanabe | ......... | G01N 35/1002 |
| 11,567,044 | B2 * | 1/2023 | Matsuoka | .............. | G01N 30/32 |
| 11,567,046 | B2 * | 1/2023 | Kurotobi | ........... | G01N 30/8655 |
| 11,959,895 | B2 * | 4/2024 | Akieda | .................. | G01N 30/24 |
| 12,078,620 | B2 * | 9/2024 | Nogami | ................. | G01N 30/30 |
| 12,271,186 | B2 * | 4/2025 | Prashanth | .......... | G01N 35/1095 |
| 2005/0269264 | A1 * | 12/2005 | Fermier | ............... | B01D 15/163 |
| | | | | | 210/136 |
| 2006/0171855 | A1 | 8/2006 | Yin et al. | | |
| 2007/0181801 | A1 | 8/2007 | Yamada et al. | | |
| 2010/0250174 | A1 | 9/2010 | Tokunaga et al. | | |
| 2012/0255341 | A1 | 10/2012 | Nozaka et al. | | |
| 2013/0014566 | A1 * | 1/2013 | Marks | .................... | G01N 30/24 |
| | | | | | 73/61.55 |
| 2017/0276652 | A1 | 9/2017 | Funada | | |
| 2018/0269047 | A1 | 9/2018 | Zhu | | |
| 2018/0284079 | A1 * | 10/2018 | Yasunaga | ............... | G01N 30/20 |
| 2019/0369070 | A1 * | 12/2019 | Terada | ................... | G01N 30/86 |
| 2020/0124576 | A1 | 4/2020 | Kobold et al. | | |
| 2021/0148869 | A1 | 5/2021 | Yokoi et al. | | |
| 2021/0223218 | A1 | 7/2021 | Maekawa | | |
| 2022/0050091 | A1 | 2/2022 | Sugiyama et al. | | |
| 2024/0192182 | A1 * | 6/2024 | Iijima | ................ | G01N 30/6091 |

FOREIGN PATENT DOCUMENTS

| | | | |
|---|---|---|---|
| JP | 2001-153875 | A | 6/2001 |
| JP | 2004-354144 | A | 12/2004 |
| JP | 2005-257609 | A | 9/2005 |
| JP | 2006-215033 | A | 8/2006 |
| JP | 2007-213934 | A | 8/2007 |
| JP | 2008-209334 | A | 9/2008 |
| JP | 2010-236962 | A | 10/2010 |
| JP | 2012-145513 | A | 8/2012 |
| JP | 2012-220245 | A | 11/2012 |
| JP | 2015-052533 | A | 3/2015 |
| WO | 2017050096 | A1 | 3/2017 |
| WO | 2017103180 | A1 | 6/2017 |
| WO | 2017164417 | A1 | 9/2017 |
| WO | 2017216934 | A1 | 12/2017 |
| WO | 2020121660 | A1 | 6/2020 |

OTHER PUBLICATIONS

Search Report mailed Feb. 8, 2022 in International Application No. PCT/JP2021/044230.
Written Opinion mailed Feb. 8, 2022 in International Application No. PCT/JP2021/044230.
Search Report mailed Jul. 15, 2022 in European Application No. 19897194.7.
Search Report mailed Jan. 21, 2020 in International Application No. PCT/JP2019/042053.
Written Opinion mailed Jan. 21, 2020 in International Application No. PCT/JP2019/042053.
International Preliminary Report on Patentability mailed Sep. 17, 2020 in International Application No. PCT/JP2019/042053.
Search Report mailed Oct. 4, 2024 in European Application No. 21903291.9.
Notice of Allowance mailed Nov. 3, 2023 in U.S. Appl. No. 17/296,317.
International Preliminary Report on Patentability mailed Jun. 22, 2023 in International Application No. PCT/JP2021/044230.

* cited by examiner

[FIG. 1]
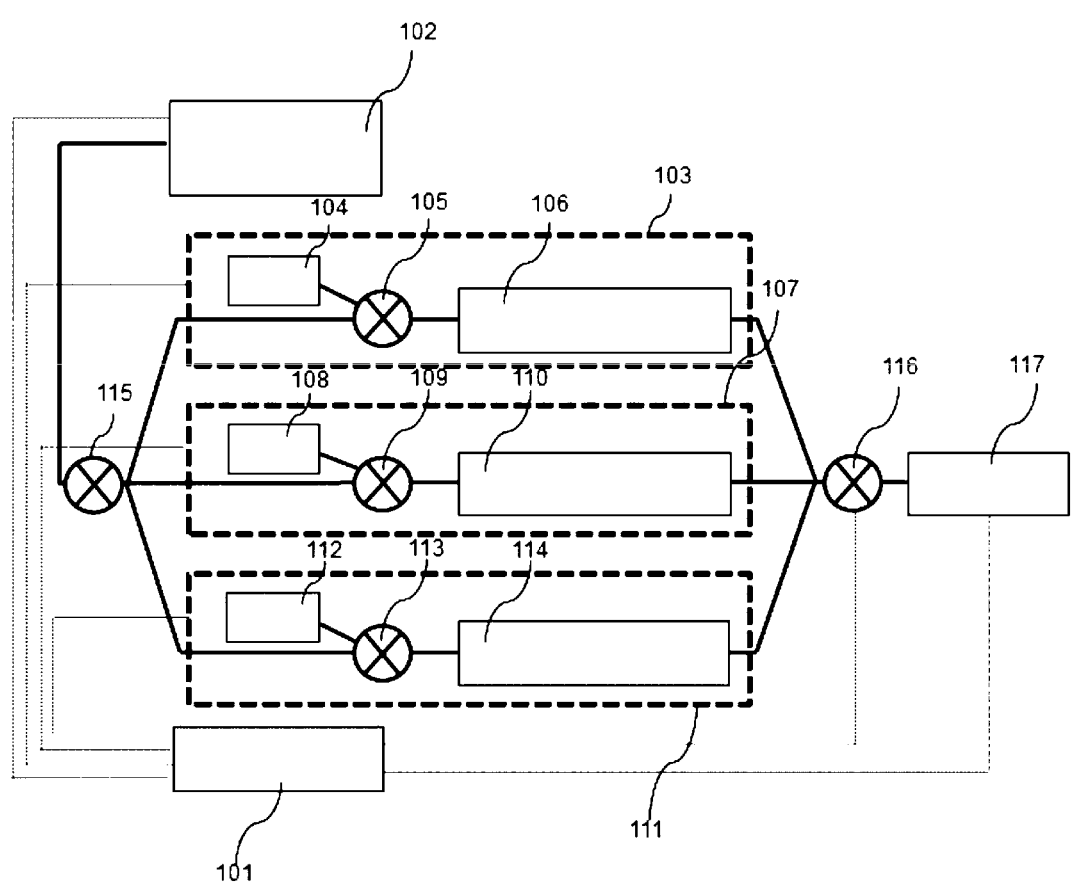
[FIG. 2]
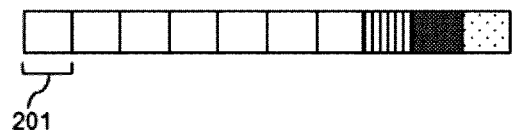

[FIG. 3]
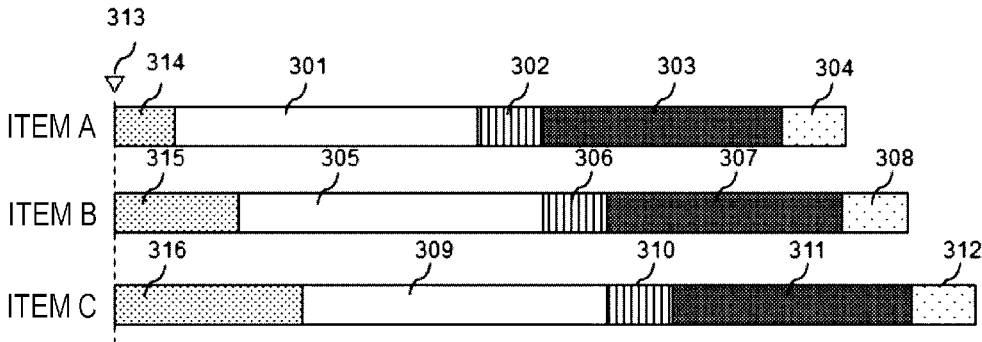

[FIG. 4]
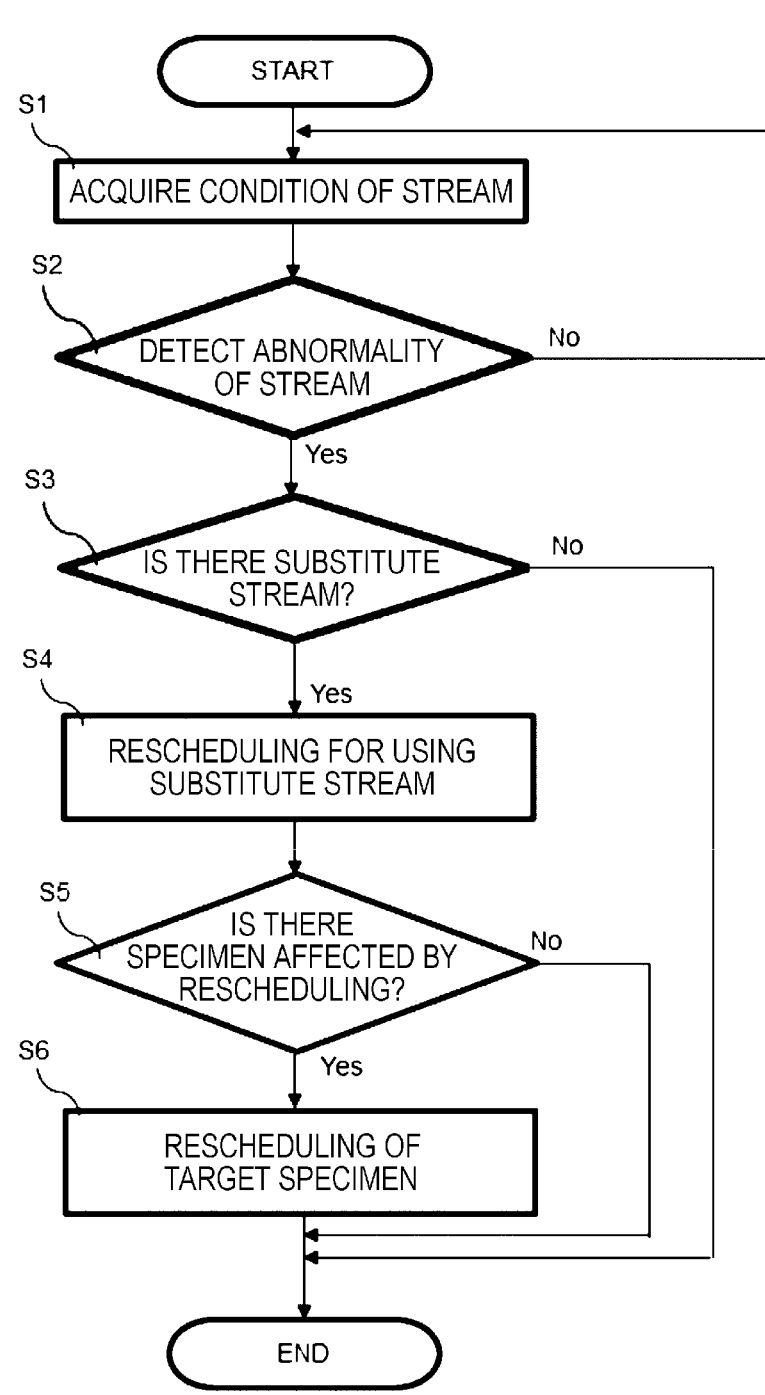

[FIG. 5]
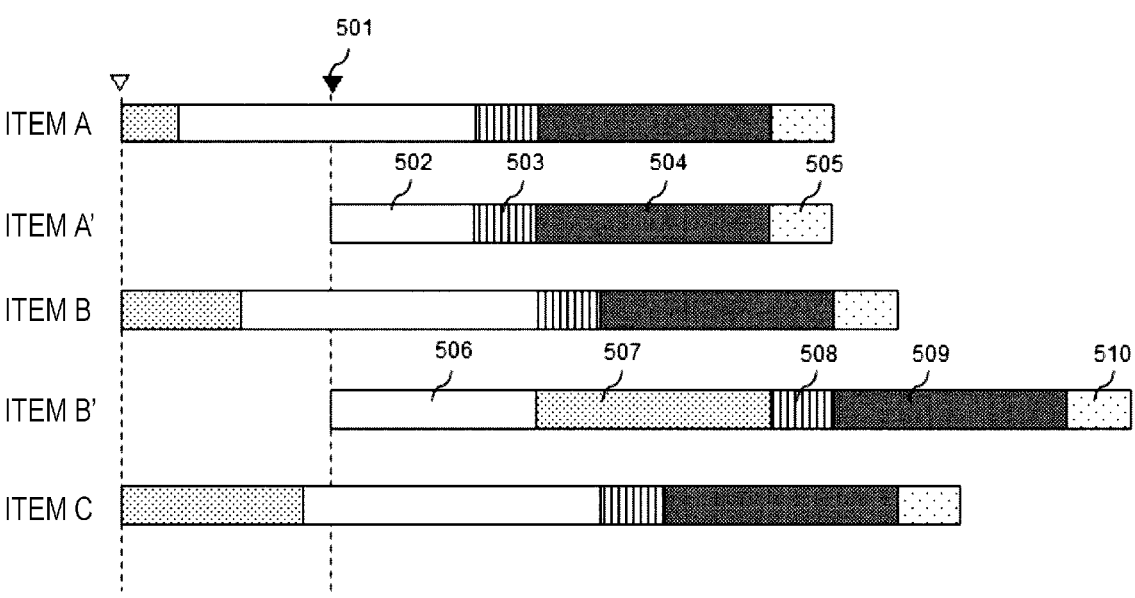
[FIG. 6]
| ANALYSIS ITEM | ELUENT | COLUMN | INITIAL STREAM | SUBSTITUTE STREAM |
|---|---|---|---|---|
| TEST A | SOLUTION A | COLUMN X | STREAM 1 | STREAM 2 |
| TEST B | SOLUTION A | COLUMN X | STREAM 2 | STREAM 1 |
| TEST C | SOLUTION B | COLUMN X | STREAM 3 | NONE |
| TEST D | SOLUTION C | COLUMN Y | STREAM 4 | NONE |
| TEST E | SOLUTION D | COLUMN Z | STREAM 5 | NONE |
601   602   603   604   605

[FIG. 7]

| ANALYSIS ITEM | ELUENT | COLUMN | INITIAL STREAM | SUBSTITUTE STREAM |
|---|---|---|---|---|
| TEST A ▼ | SOLUTION A ▼ | COLUMN X ▼ | STREAM 1 ▼ | STREAM 2 ▼ |
| TEST B ▼ | SOLUTION A ▼ | COLUMN X ▼ | STREAM 2 ▼ | STREAM 1 ▼ |
| TEST C ▼ | SOLUTION B ▼ | COLUMN X ▼ | STREAM 3 ▼ | NONE ▼ |
| TEST D ▼ | SOLUTION C ▼ | COLUMN Y ▼ | STREAM 4 ▼ | NONE ▼ |
| TEST E ▼ | SOLUTION D ▼ | COLUMN Z ▼ | STREAM 5 ▼ | NONE ▼ |

701  702  703  704  705

OK    Cancel 706    707

METHOD OF CONTROLLING MULTI-STREAM AUTOMATIC ANALYZER TIMING

TECHNICAL FIELD

The present invention relates to a method of controlling an automatic analyzer.

BACKGROUND ART

The liquid chromatograph is an analyzer that adds a sample including a component to be measured to a mobile phase fed to a column for separating the sample, that performs component separation for the sample by a stationary phase, that detects, by a detector, components separated is different time components, and that identifies the component of the sample.

For example, in a high-performance liquid chromatograph (HELD) using a solvent in the mobile phase, a liquid feeding device feeds the solvent under a high pressure, and a sample injected from a sample injection unit disposed downstream of the liquid feeding device into an analysis flow path is separated into components by a separation column filled with the stationary phase. The components are detected using the detector such as an ultraviolet and visible absorptiometer, a fluorescence photometer, or a mass spectrometer, and are identified. In this case, the detector is appropriately selected according to an analysis purpose and the sample.

A liquid chromatograph mass spectrometer in which a mass spectrometer acquiring mass information of a measurement target and a liquid chromatograph are combined is an analyzer that introduces each component separated from a measurement sample in a time component by the liquid chromatograph into the mass spectrometer and that acquires mass information. This liquid chromatograph mass spectrometer is widely used for qualitative analysis and quantitative analysis.

In recent years, an opportunity increases to use the liquid chromatograph mass spectrometer in order to quantitatively measure a drug component and a metabolite in a biological sample, and a residue in an environmental sample. Accordingly, the liquid chromatograph mass spectrometer is expected to be applied to a clinical examination field.

An object in a case where the liquid chromatograph mass spectrometer is applied to the clinical examination field is a so-called throughput improvement in which a result report is performed rapidly.

In the clinical examination field, automation for processing is required from viewpoints of prevention of an infectious disease and usability.

Therefore, a liquid chromatograph mass spectrometer is proposed that automates a pretreatment step of purifying a sample from a human-derived specimen such as serum or urine, and that automatically introduces the sample obtained by the pretreatment into a liquid chromatograph.

In such a liquid chromatograph mass spectrometer, for n analysis items, the number of flow paths (streams) each provided with a separation column of the liquid chromatograph is 3 to 5, and the number of sample introduction ports to a detector is 1. Therefore, it is important to create an analysis schedule at a timing at which the specimen is received such that not only timings of sample introduction into the stream but also timings of sample introduction into the detector do not overlap with each other.

PTL 1 relates to a technique for creating an analysis schedule for a multi-stream chromatograph mass spectrometer having multiple streams. PTL 1 describes a technique in which an analysis schedule is pre-created such that streams of a plurality of liquid chromatograms can operate in parallel and a mass spectrometer can collect data at a timing of each component elution. A control unit performs control so as to: divide a time required to analyze a sample in each of a plurality of liquid chromatogram systems into a pre-collection time, a time during collection, and a post-collection time; assign the time during collection by searching for a time position where the times during collection of the chromatogram units do not overlap; determine start times for the plurality of liquid chromatogram units to create an analysis schedule; and thereafter perform analysis. The control unit further stores a parameter set for changing a component elution time, adjusts an analysis parameter to become a data collection timing appropriate for creation of the analysis schedule, and changes the component elution time." (see ABSTRACT).

CITATION LIST

Patent Literature

PTL 1: WO2017/216934

SUMMARY OF INVENTION

Technical Problem

Bach stream in the multi-stream liquid chromatograph mass spectrometer includes at least a liquid feeding pump and a separation column.

Since performance of the separation column used in the chromatograph is degraded due to repeating measurements, the separation column required to periodically replaced. In the multi-stream liquid chromatograph mass spectrometer, when the separation column of any stream is required to be replaced, the stream becomes unusable. At this time, when another stream is usable, the multi-stream liquid chromatograph mass spectrometer can continue analyzing the specimen.

However, in the liquid chromatograph mass spectrometer that automatically performs a series of processes of performing pretreatment for a specimen, introducing the sample obtained by the pretreatment into the liquid chromatography and then detecting the sample by the detector, as described above, it is necessary to appropriately set, at the timing at which the specimen is received, the timing of sample introduction into each stream and the timing of sample introduction into the detector.

Therefore, in a case where an abnormality occurs in a stream due to some factor after the creation of the analysis schedule and the stream becomes unusable, analysis of the sample which is to use the stream for performing a process according to the analysis schedule is not performed even when the liquid chromatograph includes multiple streams, leading to loss of a specimen and delay in a result report.

An object of the invention is to solve the above problem, and to provide a method of controlling an automatic analyzer that continues processing even when a stream becomes unusable in a situation where a liquid chromatograph includes multiple streams.

Solution to Problem

In order to solve the above problem, for example, a configuration described in claims is adopted. The present application includes a plurality of solutions for solving the above problem, and an example thereof is a method of controlling an automatic analyzer including: searching whether there exists a substitute stream that can be substituted, in a case where an abnormality of a stream is detected after setting an analysis schedule; and modifying the analysis schedule, if the substitute stream exists, such that a sample scheduled to be introduced into the stream which has been detected to have the abnormality is introduced into the substitute stream, and treatment timings in a detector of the sample which has passed through the substitute stream and a sample which has passed through another normal stream do not overlap with each other. The automatic analyzer includes: a pretreatment unit that purifies a sample by pretreating a specimen; a separation unit that separates the sample by a liquid chromatograph having multiple streams; and a detector that detects the separated sample. Treatment timings of the sample in the separation unit and the detector are controlled based on the analysis schedule.

Advantageous Effects of Invention

According to the invention, it is possible to provide a method of controlling as automatic analyzer that continues processing even when a stream becomes unusable in a situation where a liquid chromatograph includes multiple streams. Problems, configurations and effects other than those described above will be clarified by the description of the following Examples.

BRIEF DESCRIPTION OF DRAWINGS

FIG. 1 is a conceptual diagram of a multi-stream liquid chromatograph mass spectrometer according to Examples.
FIG. 2 is a conceptual diagram of analysis scheduling of a specimen using one stream.
FIG. 3 is a time chart of three analysis items respectively using different streams.
FIG. 4 is a flowchart illustrating rescheduling according to Examples.
FIG. 5 is an analysis time chart after rescheduling according to Examples.
FIG. 6 is a diagram illustrating a stream setting table.
FIG. 7 is an example of the stream definition screen.

DESCRIPTION OF EMBODIMENTS

Hereinafter, Examples will be described with reference to the drawings.

In the following Examples, a liquid chromatograph (HPLC) is used as a chromatograph. However, the invention can also be applied to another chromatograph, for example, a GC mass spectrometer using a gas chromatograph (GC).

In the Examples of the invention, a liquid chromatograph mass spectrometer using a mass spectrometer as a detector of the liquid chromatograph is described. However, the invention can also be applied to a detector other than the mass spectrometer, for example, a visible and ultraviolet absorbance detector, a photodiode array detector, or a fluorescence detector.

FIG. 1 is a conceptual diagram of a multi-stream liquid chromatograph mass spectrometer according to the Examples. FIG. 2 is a conceptual diagram of analysis scheduling of a specimen using one stream. FIG. 3 shows an outline of a time chart of analysis for different analysis items A to C using different streams in consideration of FIG. 2.

As shown in FIG. 1, the multi-stream liquid chromatograph mass spectrometer includes: a pretreatment system 102 that purifies a sample by pretreating a specimen; a stream 103; a stream 107; a stream 111; a liquid chromatograph switching valve 115 that dispenses the sample obtained by the pretreatment system 102 to the stream 103, the stream 107, and the stream 111; a detector flow path switching valve 116; a detector 117; and a control unit 101 that controls the pretreatment system 102, the liquid chromatograph switching valve 115, the stream 103, the stream 107, the stream 111, the detector flow path switching valve 116, and the detector 117.

The stream 103 includes a liquid feeding device (Pump (feeding device)) 104 that feeds a solvent serving as a mobile phase to an analysis flow path under a high pressure, an injection valve 105 that is connected to the liquid feeding device 104 and that introduces the sample into the analysis flow path, and a separation column (Column) 106 that is connected downstream of the injection valve 105, that is supplied with the sample from the injection valve 105 via the analysis flow path, and that separates the supplied sample into components.

The stream 107 has a configuration similar to that of the stream 103, and includes a liquid feeding device (Pump) 108 that feeds a solvent serving as a mobile phase under a high pressure, an injection valve 109 that is connected to the liquid feeding device 108 and that introduces the sample into an analysis flow path, and a separation column (Column) 110 that is connected downstream of the injection valve 109 and that separates the sample into components.

The stream 111 also has a configuration similar to that of the stream 103, and includes a liquid feeding device (Pump) 112 that feeds a solvent serving as a mobile phase under a high pressure, an injection valve 113 that is connected to the liquid feeding device 112 and that introduces the sample into an analysis flow path, and a separation column (Column) 114 that is connected downstream of the injection valve 113 and that separates the sample into components.

The separation column 106 of the stream 103, the separation column 110 of the stream 107, and the separation column 114 of the stream. 111 are connected in parallel to one detector (mass spectrometer) 117 via the detector flow path switching valve 116.

After performing the pretreatment of the specimen, the pretreatment system 102 dispenses the sample to the injection valves 105, 109, and 113 that are respectively connected to the analysis flow paths of the streams 103, 107, and 111 via the liquid chromatograph switching valve 115. The sample is introduced into the detector 117 by the detector flow path switching valve 116.

One liquid chromatograph switching valve 115 is shown in FIG. 1. Alternatively, a plurality of liquid chromatograph switching valves 115 may be provided, or a nozzle may be formed instead of a valve such that the sample can be introduced into each stream.

One detector flow path switching valve 116 is shown in FIG. 1. Alternatively, a plurality of detector flow path switching valves 116 may be provided.

A device including the streams 103, 107, and 111 is referred to as a multi-stream liquid chromatograph.

In FIG. 2, a cycle 201 is a minimum unit of an analysis schedule created by the control unit 101.

The control unit 101 creates the analysis schedule such that each of a pretreatment process based on a property of an item to be analyzed, introduction into a separation unit, preparation of a mobile phase required at a time of introduction, and introduction of a sample that has been separated to the detector is in unit of cycle, and such that introduction timings of a plurality of specimens particularly into the detector do not overlap with each other.

As an example, in a case of analysis using the stream 103 and the stream 107, it is necessary for the control unit 101 to perform scheduling such that timings of introduction into the liquid chromatograph switching valve 115 do not overlap with each other in consideration of the liquid feeding device 104 at which the solvent serving as the mobile phase is fed under the high pressure prior to the sample introduction into the separation column 106 regarding a specimen using the stream 103 and an operation timing of the liquid feeding device 108 at which the solvent serving as the mobile phase is fed under the high pressure prior to the sample introduction into the separation column 110 regarding a specimen using the stream 107, and such that timings at which the samples are introduced into the detector flow path switching valve 116 and the detector 117 do not overlap with each other.

In FIG. 3, a scheduling timing 313 indicates a creation timing of the analysis schedule. Preparation cycles 314, 315, and 316 indicate preparation times in which the specimens are dispensed advance to containers necessary for the pretreatments. Pretreatment cycles 301, 305, and 309 indicate the pretreatments of the specimens in the pretreatment system 102. Sample introduction cycles 302, 306, and 310 indicate introduction of the samples into the liquid chromatograph switching valve 115 and the injection valves 105, 109, and 113.

Separation cycles 303, 307, and 311 indicate separation of the samples in the separation columns 106, 110, and 114 and introduction of the samples into the detector by the detector flow path switching valve 116.

Detection cycles 304, 308, and 312 indicate detection timings in the detector 117.

Based on the drawing, the control unit 101 recognizes the specimens to be analyzed at the scheduling timing 313, performs a series of processes of the pretreatment cycle 301, the sample introduction cycle 302, the separation cycle 303, and the detection cycle 304 for The specimens, and creates the analysis schedule such that the detection cycles 304, 308, and 312 of the specimens in the detector 117 do not overlap with each other. The following analysis operation is performed.

Next, rescheduling, which is a main part in the Examples of the invention, will be described with reference to FIGS. 3, 4, and 5. FIG. 4 is a flowchart when the rescheduling occurs. FIG. 5 shows an analysis time chart after the rescheduling.

Here, the case of the configuration having the three streams exemplified in FIG. 1 will be described. The invention can be applied to multi-stream liquid chromatograph mass spectrometer having two or more streams.

The control unit 101 creates the analysis schedule for an Item A, an Item B, and an. Item C at the scheduling timing 313 in FIG. 3. Here, it is assumed that separation columns for the Item. A and the Item B can measure the same item.

The pretreatment cycles 301, 305, and 309 are performed in parallel after the preparation cycles 314, 315, and 316.

After creating the analysis scheduling, the control unit 101 acquires a state of the stream for each cycle after start of the pretreatment cycle (step S1).

Next, in step S2, it is checked whether the stream. 103 is usable. If the stream 103 is usable, the process continues.

When an abnormality of the stream 103 is detected in step S2, it is checked whether there exists an alternative stream (step S3) if there exists no alternative stream, the process for the specimen is not performed.

If there exists the alternative stream. 107 in step S3, rescheduling is performed such that the stream 107 is used for the Item A (step S4).

In response to the occurrence of the rescheduling for the Item A, the control unit 101 checks whether there exists a specimen scheduled to use the stream. 107 at the time of the scheduling timing 313 (step S5).

If there exists a specimen scheduled to use the stream 107, a competition occurs in treatment timings in the stream. 107 as in the scheduling at the start of the analysis by the rescheduling for the Item. A, Therefore, rescheduling is performed for the item B scheduled to use the stream 107 such that timings of sample introduction into the stream 107 do not overlap with each other and timings of sample introduction into the detector flow path switching valve 116 and the detector 117 do not overlap with each other.

Accordingly, after sample introduction into the stream for the rescheduled Item A is performed, sample introduction for the Test. B is sequentially performed.

A standby cycle occurs in the sample of the Item B for which timings from completion of the pretreatment to the introduction into the stream are changed by the rescheduling. Regarding a standby method in the standby cycle, an empty position in the pretreatment system 102 may be used or a standby-dedicated position may be provided in the pretreatment system 102.

In FIG. 5, as a result of the rescheduling at a rescheduling timing 501, the Item A becomes an Item A', which is subject to a pretreatment cycle after rescheduling 502, a sample introduction cycle after rescheduling 503, a separation cycle after rescheduling 504, and a detection cycle after rescheduling 505, and the item B becomes an item B', which is subject to a pretreatment cycle after rescheduling 506 and a standby cycle after rescheduling 513, and then is subject to a sample introduction cycle after rescheduling 508, a separation cycle after rescheduling 509, and a detection cycle after rescheduling 510. The scheduling is performed such that timings of introduction of the Item A' and the item B' using the same stream and the Item C using another stream into the detector 117 do not overlap with each other.

A priority may be taken into consideration at the time of the rescheduling.

In general, a clinical analyzer performs a general specimen measurement in which a process is performed in a specimen receiving order, and an emergency specimen measurement in which a process for specimen is preferentially performed.

As an example, when a request for an emergency specimen is received while the process for a general specimen is being performed, the process for the general specimen is temporarily suspended, and measurement for the general specimen is performed again after measurement for the emergency specimen is performed.

In the case in the invention, in particular, in the liquid chromatograph mass spectrometer in which an order of sample introduction into the detector leads to a measurement result report order, the priority of the specimen being measured is acquired at the timing of the rescheduling. When there exists a specimen having a high priority, the specimen is rescheduled to be preferentially processed, leading to a rapid measurement result report.

Next, a definition of a substitute stream will be described with reference to FIGS. 6 and 7.

A stream of a liquid chromatograph is based on a combination of an analysis item and a type of a column such as a filler or a material and a length of a column body, or a combination of the analysis item and a composition of an eluent used as a mobile phase.

That is, it is possible to determine a substitute criterion of a stream based on the combination of the analysis item and the column, and the combination of the analysis item and the eluent.

Substitute of a stream may be defined in advance as a table in a device, or may be freely set by a user on an operation screen.

FIG. 6 shows an example of a stream definition table.

A Test A in an analysis item 601 is defined as a stream 1 in an initial stream 604 by an eluent 602 and a column 603.

Next, a Test B in the analysis item 601 is defined as a stream 2 in the initial stream 604 by a combination in the eluent 602 and the column 603, but is defined as the stream 1 in a substitute stream 605 by a combination in the analysis item 601, the eluent 602, and the column 603. Similarly, the Test A in the analysis item 601 is also defined as the stream 2 in the substitute stream 605. Both the Test A and the Test B are defined as substitute streams.

On the other hand, a Test C, a Test D, and a Test E in the analysis item 601 are different from each other in the initial stream 604 due to inconsistent combinations in the eluent 602 and column 603, and are also "NONE" in the substitute stream 605.

FIG. 7 shows an example of a stream definition screen.

Analysis item switching buttons 701, eluent switching buttons 702, column switching buttons 703, initial stream switching buttons 704, and substitute stream switching buttons 705 can be operated by the user. It is possible to set an initial stream and a substitute stream by selectively inputting the items. Since the substitute stream can be switched, the stream can be set to be not substituted even when the condition is satisfied.

Contents set in this screen are stored in a system by pressing a setting-save button 706, and are discarded by pressing a cancel button 707 when the setting is not performed.

As described above, in the present example, a method of controlling an automatic analyzer includes: searching whether there exists a stream that can be substituted when an abnormality of any one of streams is detected after creation of an analysis schedule at a time of receiving a specimen, and modifying the analysis schedule, if the stream that can be substituted exists, such that a sample scheduled to be introduced into the stream which has been detected to have the abnormality is introduced into the substitute stream, and treatment timings in a detector of the sample which has passed through the substitute stream and a sample which has passed through another normal stream do not overlap with each other. The automatic analyzer includes: a multi-chromatograph device including a plurality of liquid chromatographs; at least one sample dispensing mechanism that dispenses the sample to an injection valve of the multi-chromatograph; the detector that analyzes the sample; a flow path switching valve that introduces the sample separated by a separation column of any one of the plurality of chromatography devices into the detector via an analysis flow path; and a control unit that controls operations of the multi-chromatograph, the sample dispensing mechanism, the flow path switching valve, and the detector. Each of the liquid chromatographs includes: a pretreatment unit that purifies the sample by pretreating the specimen; a feeding device that feeds a mobile phase to the analysis flow path; the injection valve that is connected to the feeding device and that introduces the sample obtained by the pretreatment unit into the analysis flow path; and the separation column that connected downstream of the injection valve and that separates the sample into components. The control unit creates, at start of a specimen process in the pretreatment unit, the analysis schedule such that timings of sample introduction into the separation column of each of the plurality of chromatographs do not overlap with each other and timings of sample introduction into the detector do not overlap with each other.

Accordingly, even when the stream scheduled to be used after the creation of the analysis schedule becomes unusable due to the abnormality, the analysis schedule is reset when the stream that can be substituted exists such that the substitute stream is used, so that it is possible to avoid loss of the specimen and delay in a result report time.

OTHERS

The invention is not limited to the above example, and includes various codifications. For example, the above example has been described in detail for easy understanding of the invention, and the invention is not necessarily limited to those including all of the configurations described above.

REFERENCE SIGNS LIST

101: Control unit
102: Pretreatment system
103, 107, 111: Stream
104, 108, 112: Liquid feeding device
105, 109, 113: Injection valve
106, 110, 114: Separation column
115: Liquid chromatograph switching valve
116: Detector flow path switching valve
117: Detector
201: Cycle
301, 305, 309: Pretreatment cycle
302, 306, 310: Sample introduction cycle
303, 307, 311: Separation cycle
304, 308, 312: Detection cycle
313: Scheduling timing
314, 315, 316: Preparation cycle
501: Rescheduling timing
502, 506: Pretreatment cycle after rescheduling
503, 508: Sample introduction cycle after rescheduling
513: Standby cycle after rescheduling
504, 509: Separation cycle after rescheduling
505, 510: Detection cycle after rescheduling
601: Analysis item
602: Fluent
603: Column
604: Initial stream
605: Substitute stream
701: Analysis item switching button
702: Fluent switching button
703: Column switching button
704: Initial stream switching button
705: Substitute stream switching button
706: Setting-save button
707: Cancel button

The invention claimed is:
1. A method of controlling a multi-stream automatic analyzer comprising:
creating, using a processor, an analysis schedule for treatment of a plurality of samples in parallel by the multi-stream automatic analyzer using a plurality of streams each including a separation column containing a separated one of the plurality of samples;

detecting an abnormality in one of the plurality of streams using a detector connected to each of the plurality of streams in parallel and being configured to detect any one of the plurality of separated samples;

determining a substitute stream that can be substituted for the stream in which the abnormality is detected; and modifying the analysis schedule to include the substitute stream according to a rescheduling in which the sample scheduled to be introduced into the stream in which the abnormality has been detected is introduced into the substitute stream, and treatment timings of the sample introduced into the substitute stream and of the plurality of samples which are treated using one or more normal streams do not overlap with each other at the detector.

2. The method of controlling the multi-stream automatic analyzer according to claim 1, wherein the analysis schedule is modified depending on a priority of a specimen.

3. The method of controlling the multi-stream automatic analyzer according to claim 1, further comprising:

using an empty position in a sample installation position of a pretreatment unit as a standby location until the stream in which the abnormality has been detected returns to a usable condition.

4. The method of controlling the multi-stream automatic analyzer according to claim 1, wherein a standby-dedicated position is provided in a pretreatment unit and the standby-dedicated position is used as a standby location until the stream in which the abnormality has been detected returns to a usable condition.

5. The method of controlling the multi-stream automatic analyzer according to claim 1, wherein the substitute stream is defined in advance, and the use of the substitute stream is determined based on the definition.

6. The method of controlling the multi-stream automatic analyzer according to claim 1, further comprising:

receiving a setting of the substitute stream from a user via a setting screen display.

\* \* \* \* \*